US012273492B2

(12) United States Patent
Yoneda

(10) Patent No.: US 12,273,492 B2
(45) Date of Patent: Apr. 8, 2025

(54) IMAGE READING DEVICE

(71) Applicant: PFU LIMITED, Ishikawa (JP)

(72) Inventor: Yutaka Yoneda, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 69 days.

(21) Appl. No.: 18/109,153

(22) Filed: Feb. 13, 2023

(65) Prior Publication Data

US 2023/0300271 A1    Sep. 21, 2023

(30) Foreign Application Priority Data

Mar. 17, 2022 (JP) .................. 2022-042410

(51) Int. Cl.
*H04N 1/10* (2006.01)
*H04N 1/195* (2006.01)

(52) U.S. Cl.
CPC .......... *H04N 1/10* (2013.01); *H04N 1/19594* (2013.01); *H04N 2201/0422* (2013.01); *H04N 2201/0434* (2013.01); *H04N 2201/0452* (2013.01)

(58) Field of Classification Search
None
See application file for complete search history.

(56) References Cited

U.S. PATENT DOCUMENTS 11,184,496 B2    11/2021    Orita et al.
2020/0314283 A1*  10/2020    Anami ............... H04N 1/00702

FOREIGN PATENT DOCUMENTS

| JP | H10-208086 A | 8/1998 |
| JP | 2004-080582 A | 3/2004 |
| WO | 2020/021716 A1 | 1/2020 |

* cited by examiner

*Primary Examiner* — Samira Monshi
(74) *Attorney, Agent, or Firm* — Rimon P.C.

(57) ABSTRACT

An image reading device includes a mount table in which a mount surface is formed, a guide portion in which a guide surface is formed, the guide surface facing a side end face of a first portion of a booklet medium that is mounted on the mount table such that the mount surface faces the booklet medium, and an image capturer configured to capture an image of a second portion of the booklet medium, the second portion being different from the first portion, wherein a front cover slit is formed at an end of the guide portion on a side close to the mount surface.

7 Claims, 17 Drawing Sheets

IMAGE READING DEVICE

CROSS-REFERENCE TO RELATED APPLICATION

This application is based upon and claims the benefit of priority of the prior Japanese Patent Application No. 2022-042410, filed on Mar. 17, 2022, the entire contents of which are incorporated herein by reference.

FIELD

The embodiments discussed herein are related to an image reading device.

BACKGROUND

Image reading devices that read images on media in various sizes and that read images of booklet media exemplified by passports are known (Japanese Laid-open Patent Publication No. 10-208086, Japanese Laid-open Patent Publication No. 2004-80582, and International Publication Pamphlet No. WO 2020/021716).

Some passports have front covers and some do not have front covers and the size differs depending on whether the passport has a cover. Such an image reading device is provided with a plurality of guides or a movable part in order to guide a plurality of media in different sizes to an appropriate position and thus has a problem in that its configuration is complicated.

SUMMARY

According to an aspect of an embodiment, an image reading device includes a mount table in which a mount surface is formed, a guide portion in which a guide surface is formed, the guide surface facing a side end face of a first portion of a booklet medium that is mounted on the mount table such that the mount surface faces the booklet medium, and an image capturer configured to capture an image of a second portion of the booklet medium, the second portion being different from the first portion, wherein a front cover slit is formed at an end of the guide portion on a side close to the mount surface.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
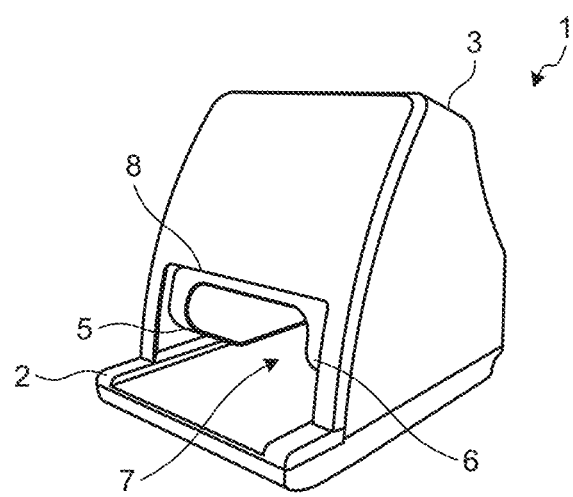
FIG. 1 is a perspective view illustrating an image reading device of an embodiment.

An image reading device according to an embodiment disclosed herein will be described with reference to the accompanying drawings. The following description does not limit the technique of the disclosure. In the following description, the same reference numerals are assigned to the same elements and redundant description thereof will be omitted.

Embodiment

As illustrated in FIG. 1, an image reading device 1 according to the embodiment includes a mount table 2, a housing 3, a left-side guide member 5, and a right-side guide member 6. FIG. 1 is a perspective view illustrating an image reading device of the embodiment. The mount table 2 is mounted on a surface on which the image reading device 1 is set. The housing 3 is formed from a material that does not transmit light easily and is formed into a box-like shape. The housing 3 is arranged on the mount table 2 and is fixed to the mount table 2. In the housing 3, an internal space 7 that is surrounded by the mount table 2 and the housing 3 is formed. An opening 8 is further formed in a front-side portion of the housing 3. The internal space 7 is connected to the outside of the housing 3 via the opening 8.

Figure 2:
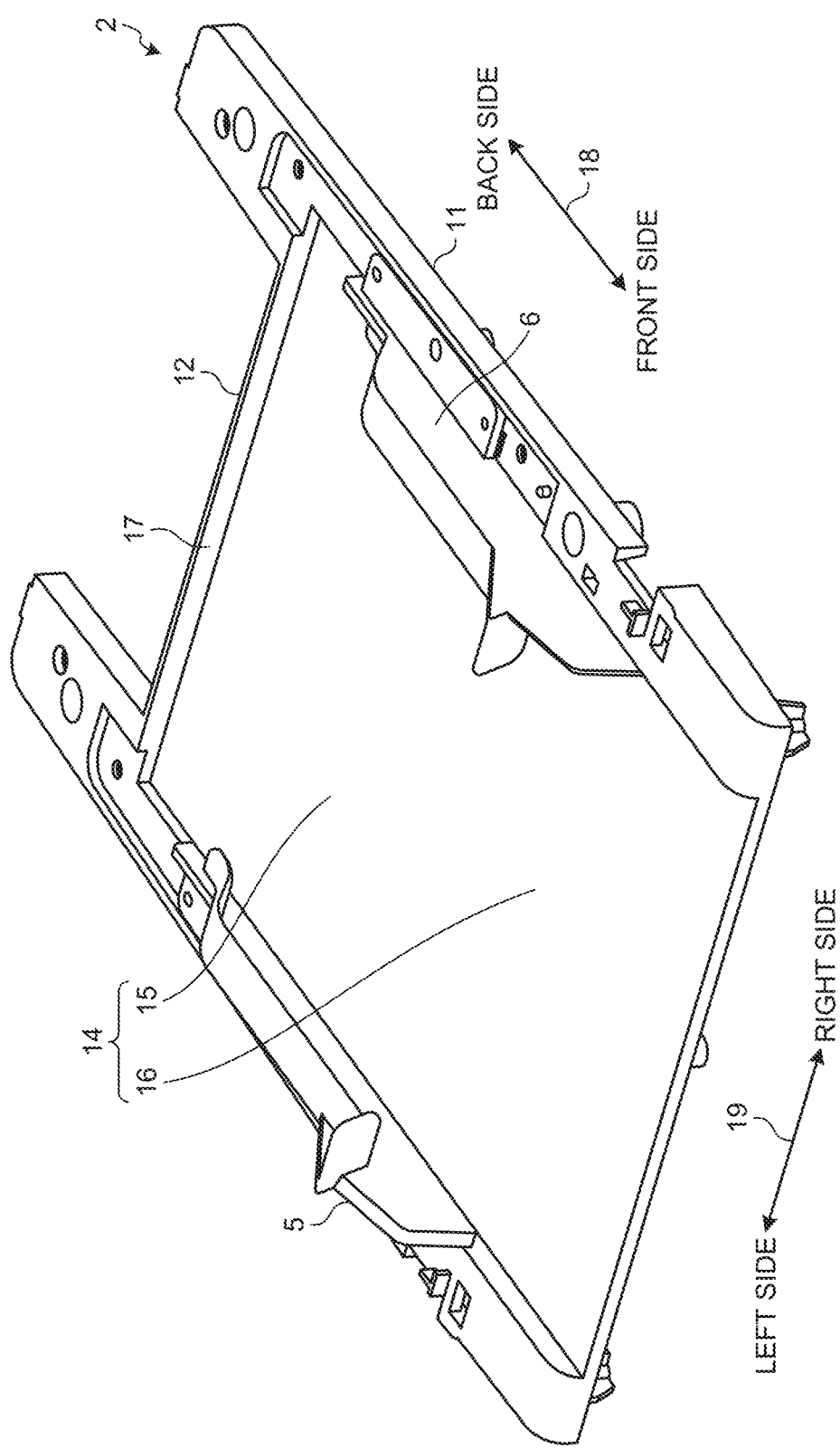
FIG. 2 is a perspective view illustrating a mount table, a left-side guide member, and a right-side guide member.

FIG. 2 is a perspective view illustrating the mount table 2, the left-side guide member 5, and the right-side guide member 6. The mount table 2 includes a mount table body 11 and an abutting portion 12. The mount table body 11 is formed into an approximately platy shape. In the mount table body 11, a mount surface 14 that is approximately flat is formed. The mount surface 14 includes a thin portion facing area 15 and a thick portion facing area 16. The thin portion facing area 15 and the thick portion facing area 16 are aligned in an insertion direction 18 that is parallel to a plane along which the mount surface 14 is and the thick portion facing area 16 is arranged on a front side with respect to the thin portion facing area 15. The housing 3 is arranged on the mount table body 11 such that the thin portion facing area 15 is arranged in the internal space 7 and such that the thick portion facing area 16 is partly arranged outside the housing 3 via the opening 8.

The abutting portion 12 is formed into a band-like shape. In the abutting portion 12, a striking surface 17 that is flat is formed. The abutting portion 12 is arranged on a back side of the mount surface 14 such that a plane along which the striking surface 17 is perpendicular to the insertion direction 18 and such that the striking surface 17 faces the front side. The abutting portion 12 is formed integrally with the mount table body 11 and is fixed to the mount table body 11.

The left-side guide member 5 is arranged on one end of the mount surface 14 on a left side in a width direction 19. The width direction 19 is parallel to the plane along which the mount surface 14 is and is perpendicular to the insertion direction 18. The right-side guide member 6 is arranged on an end of the mount surface 14 on the right side.

Figure 3:
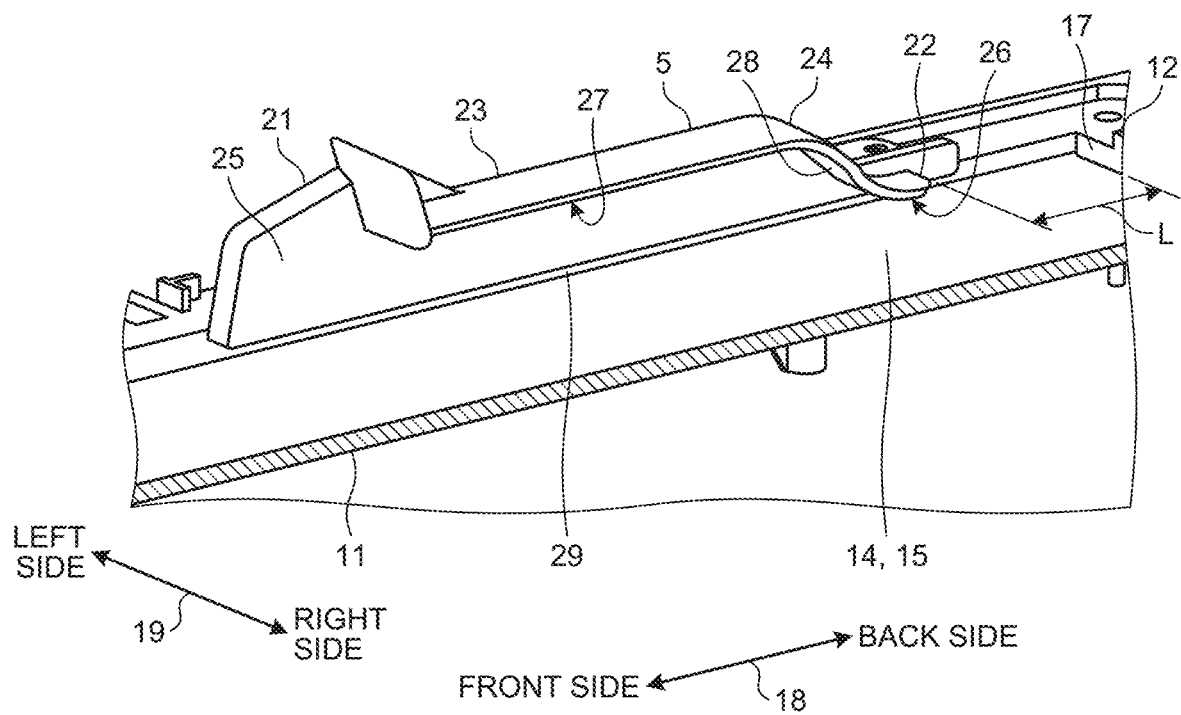
FIG. 3 is a perspective view illustrating the left-side member.

FIG. 3 is a perspective view illustrating the left-side guide member 5. The left-side guide member 5 includes a left-side side guide portion 21, a left-side holding portion 22, a left-side upper guide portion 23, and a left-side connection portion 24. In the left-side side guide portion 21, a left-side side guide surface 25 that is flat is formed. The left-side side guide portion 21 is arranged at a lower end of a left end of the internal space 7 such that the left-side side guide surface 25 faces the right side and such that a plane along which the left-side side guide surface 25 is perpendicular to the width direction 19. The left-side side guide portion 21 is fixed to the mount table body 11.

The left-side holding portion 22 is formed into a platy shape. In the left-side holding portion 22, a left-side pressing surface 26 that is flat is formed. The left-side holding portion 22 is arranged above the thin portion facing area 15 such that the left-side pressing surface 26 faces the thin portion facing area 15 and such that the left-side pressing surface 26 is along another plane that is parallel to the plane along which the mount surface 14 is. Furthermore, the left-side holding portion 22 is separate from the striking surface 17 to the front side and is arranged on the left side with respect to the thin portion facing area 15 of the mount surface 14 such that the distance between a back end of the left-side holding portion 22 and the striking surface 17 of the abutting portion 12 is equal to a length L. The left-side holding portion 22 is formed integrally with the left-side side guide portion 21 such that the left-side holding portion 22 extends from the left-side side guide surface 25, is fixed to the left-side side guide portion 21, and is fixed to the mount table body 11 via the left-side side guide portion 21.

The left-side upper guide portion 23 is formed into a belt-like shape that is flat. In the left-side upper guide portion 23, a left-side upper guide surface 27 is formed. The left-side upper guide portion 23 is arranged on the front side with respect to the left-side holding portion 22 such that the left-side upper guide surface 27 faces the thin portion facing area 15 and such that the left-side upper guide surface 27 is along another plane that is parallel to the plane along which the mount surface 14 is. Furthermore, the left-side upper guide portion 23 is arranged above the left-side holding portion 22 such that a distance between the left-side upper guide surface 27 and the thin portion facing area 15 is longer than a distance between the left-side pressing surface 26 and the thin portion facing area 15. A front end of the left-side upper guide portion 23 is arranged near the opening 8. The left-side upper guide portion 23 is formed integrally with the left-side side guide portion 21 such that the left-side upper guide portion 23 extends from the left-side side guide surface 25, is fixed to the left-side side guide portion 21, and is fixed to the mount table body 11 via the left-side side guide portion 21.

The left-side connection portion 24 is formed into a curved band-like shape. The left-side connection portion 24 is arranged between the left-side holding portion 22 and the left-side upper guide portion 23 such that a back end of the left-side connection portion 24 connects to a front end of the left-side holding portion 22 and such that a front end of the left-side connection portion 24 connects to a back end of the left-side upper guide portion 23. In the left-side connection portion 24, a left-side curved surface 28 is formed. One end of the left-side curved surface 28 is adjacent to the left-side pressing surface 26 and the other end of the left-side curved surface 28 is adjacent to the left-side upper guide surface 27. Furthermore, the left-side curved surface 28 is formed such that the distance between the left-side curved surface 28 and the mount surface 14 gets longer monotonically as it separates from the left-side holding portion 22. Furthermore, the left-side curved surface 28 is formed into a gently curved surface such that the border between the left-side curved surface 28 and the left-side pressing surface 26 has no angularity and such that the border between the left-side curved surface 28 and the left-side upper guide surface 27 has no angularity. The left-side connection portion 24 is formed integrally with the left-side side guide portion 21 such that the left-side connection portion 24 extends from the left-side side guide surface 25, is fixed to the left-side side guide portion 21, and is fixed to the mount table body 11 via the left-side side guide portion 21.

A lower end of the left-side side guide portion 21 of the left-side guide member 5 is separate from the mount surface 14 and a left-side front cover slit 29 is further formed in an end of the left-side side guide portion 21 on a side close to the mount surface 14. The left-side front cover slit 29 is formed such that the left-side front cover slit 29 is depressed from the left-side side guide surface 25.

Figure 4:
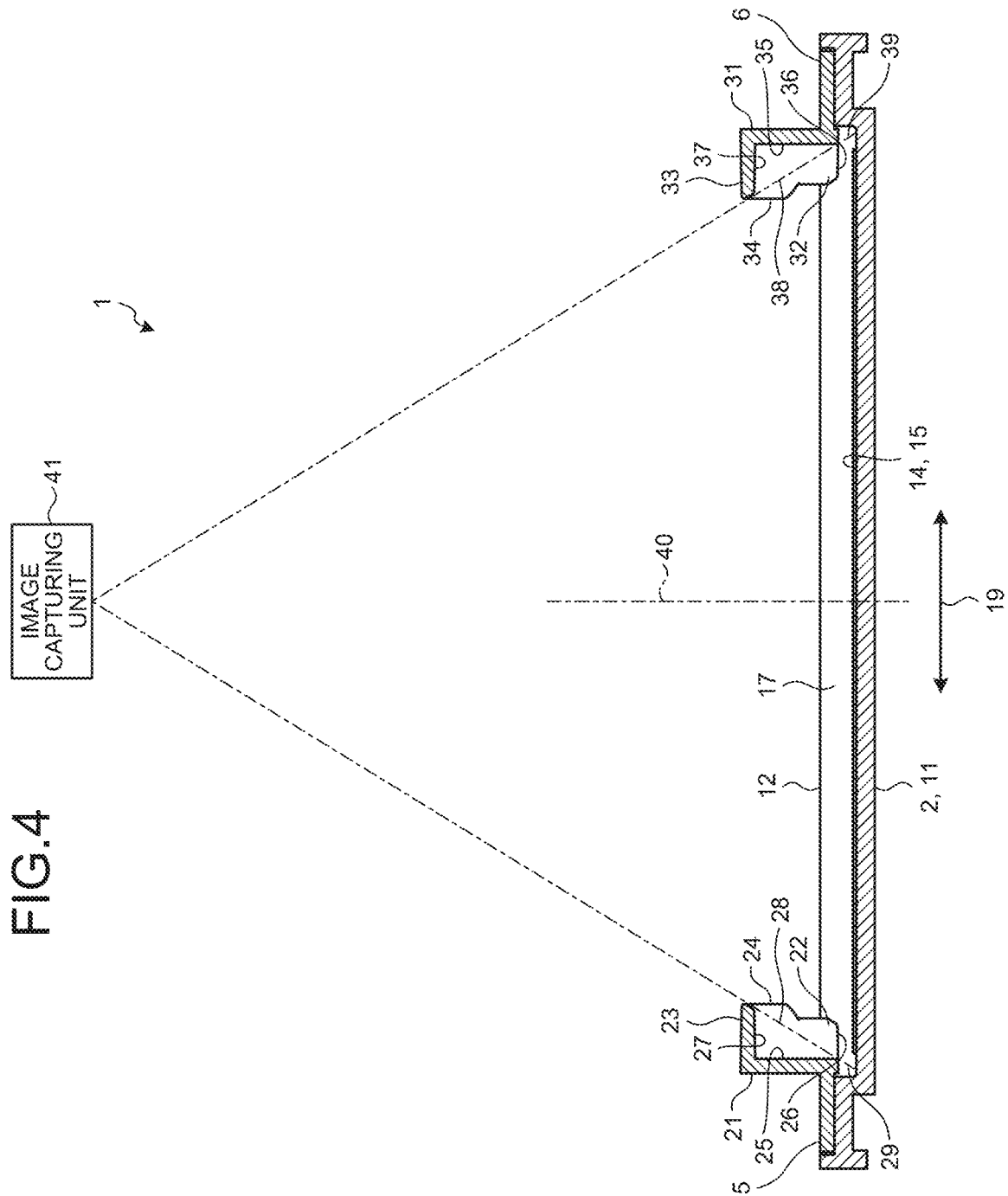
FIG. 4 is a front cross-sectional view illustrating the mount table, the left-side guide member, and the right-side guide member.

FIG. 4 is a front cross-sectional view illustrating the mount table 2, the left-side guide member 5, and the right-side guide member 6. The right-side guide member 6 is formed such that the right-side guide member 6 has a mirror symmetry with respect to the left-side guide member 5. In other words, the right-side guide member 6 includes a right-side side guide portion 31, a right-side holding portion 32, a right-side upper guide portion 33, and a right-side connection portion 34. In the right-side side guide portion 31, a right-side side guide surface 35 is formed. In the right-side holding portion 32, a right-side pressing surface 36 is formed. In the right-side upper guide portion 33, a right-side upper guide surface 37 is formed. In the right-side connection portion 34, a right-side curved surface 38 is formed.

The right-side guide member 6 is arranged such that the right-side side guide surface 35 faces the left-side side guide surface 25, that is, such that the right-side guide member 6 is symmetrical with the left-side guide member 5 on a mirror symmetry plane 40 that is orthogonal to the width direction 19, and the right-side guide member 6 is fixed to the mount table body 11 of the mount table 2. The mirror symmetry plane 40 is orthogonal to the width direction 19. On an end of the right-side side guide portion 31 of the right-side guide member 6 on a side close to the mount surface 14, a right-side front cover slit 39 is further formed. The right-side front cover slit 39 is formed such that the tight-side front cover slit 39 is depressed from the right-side side guide surface 35.

The image reading device 1 further includes an image capturing unit 41. The image capturing unit 41 is formed of a camera that captures an image of a subject. The image capturing unit 41 is arranged above the thin portion facing area 15 in the internal space 7 and intersects with the mirror symmetry plane 40. The image capturing unit 41 is fixed to the housing 3 and is fixed to the mount table 2 via the housing 3. Furthermore, the image capturing unit 41 is arranged on the mount table body 11 and is directed to the thin portion facing area 15 such that an image of a subject that is arranged near the thin portion facing area 15 is captured. The left-side upper guide portion 23 is arranged in a position sufficiently separate from the thin portion facing area 15 such that the left-side upper guide portion 23 does not intersect with a line connecting the image capturing unit 41 and a freely-selected point contained in the thin portion facing area 15. Like the left-side upper guide portion 23, the right-side upper guide portion 33 is arranged in a position sufficiently separate from the thin portion facing area 15 such that the right-side upper guide portion 33 does not intersect with a line connecting the image capturing unit 41 and a freely-selected point contained in the thin portion facing area 15.

Figure 5:
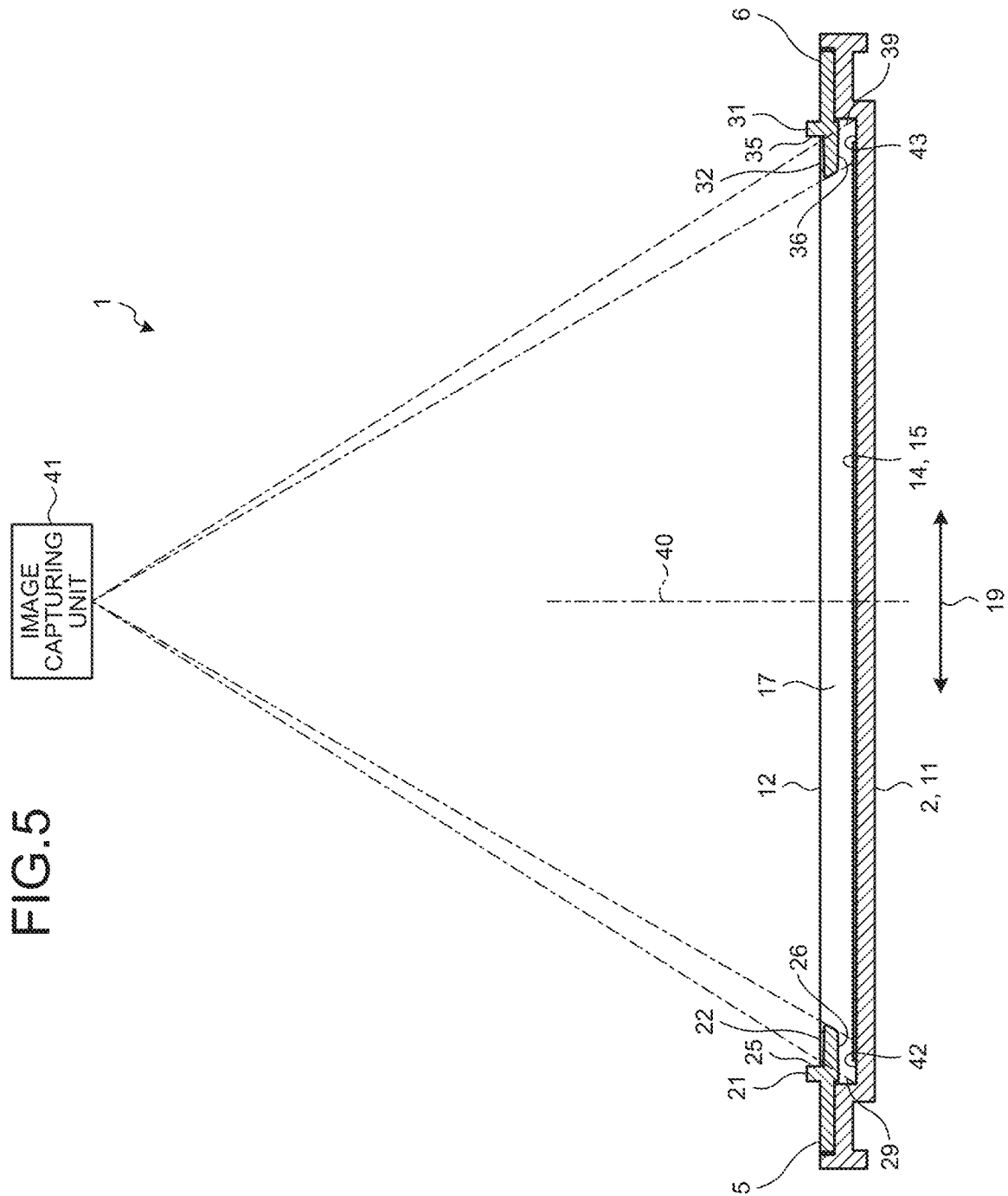
FIG. 5 is another front cross-sectional view illustrating the mount table, the left-side guide member, and the right-side guide member.

FIG. 5 is another front cross-sectional view illustrating the mount table 2, the left-side guide member 5, and the right-side guide member 6. The thin portion facing area 15 contains a left-side non-image-capturing area 42 and a right-side non-image-capturing area 43. The left-side holding portion 22 of the left-side guide member 5 intersects with a line connecting a freely-selected point contained in the left-side non-image-capturing area 42 and the image capturing unit 41. The right-side holding portion 32 of the right-side guide member 6 intersects with a line connecting a freely-selected point contained in the right-side non-image-capturing area 43 and the image capturing unit 41.

Figure 6:
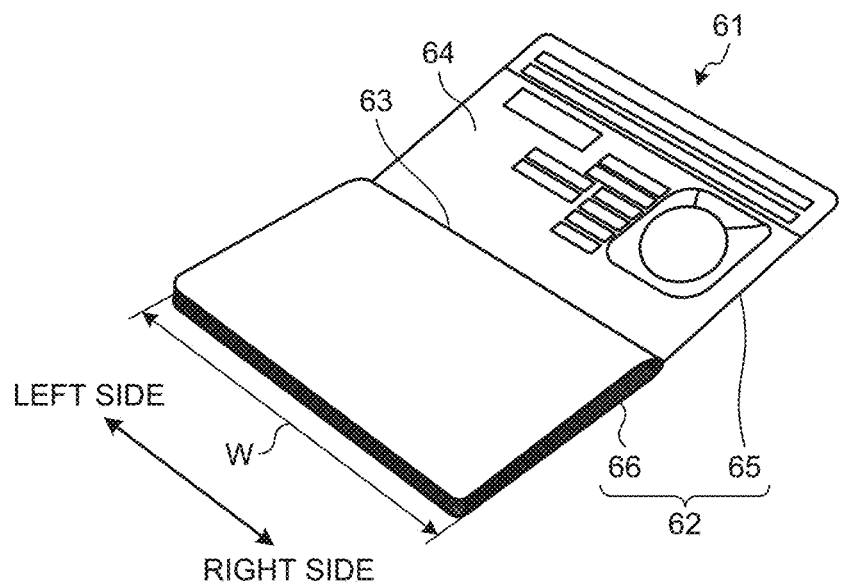
FIG. 6 is a perspective view illustrating an ICAO passport that is used in an image reading device of the embodiment.

The image reading device 1 is used to capture an image of a predetermined page of a passport. An ICAO passport 61 illustrated in FIG. 6 among passports is formed of a booklet that is bounded in a method that is determined by the International Civil Aviation Organization (ICAO). FIG. 6 is a perspective view illustrating the ICAO passport 61 that is used in the image reading device 1 of the embodiment. In the ICAO passport 61, a plurality of sheets 62 are bound by a binding portion 63. The binding portion 63 is formed linearly. In the ICAO passport 61, a face 64 is formed. The ICAO passport 61 is formed such that the face 64 is not exposed when the ICAO passport 61 is closed. The sheets 62 are separated into a thin portion 65 and a thick portion 66 when the ICAO passport 61 is opened. The thin portion 65 is formed of one of the sheets 62. The thick portion 66 is formed of a plurality of ones of the sheets 62 excluding the thin portion 65. The thick portion 66 is joined to the thin portion 65 via the binding portion 63. The face 64 is formed in the thin portion 65. When the ICAO passport 61 is interposed between two planes that are perpendicular to the straight line along which the binding portion 63 is, the width of the ICAO passport 61 is equal to a distance between the two planes and is equal to a width W.

Figure 7:
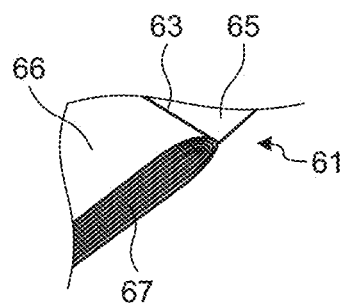
FIG. 7 is an enlarged perspective view illustrating a binding portion of the ICAO passport.

FIG. 7 is an enlarged perspective view illustrating the binding portion 63 of the ICAO passport 61. The thickness of the thick portion 66 is larger than that of the thin portion 65. In the thick portion 66, a right-side end face 67 is formed. The right-side end face 67 is formed such that the right-side end face 67 is along a plane perpendicular to the straight line along which the binding portion 63 is along. On a side opposite to the side on which the right-side end face 67 of the thick portion 66 is formed, a left-side end face is formed. The left-side end face faces in a direction opposite to the direction in which the right-side end face 67 faces. A plane along which the left-side end face is parallel to the plane along which the right-side end face 67 is.

Figure 8:
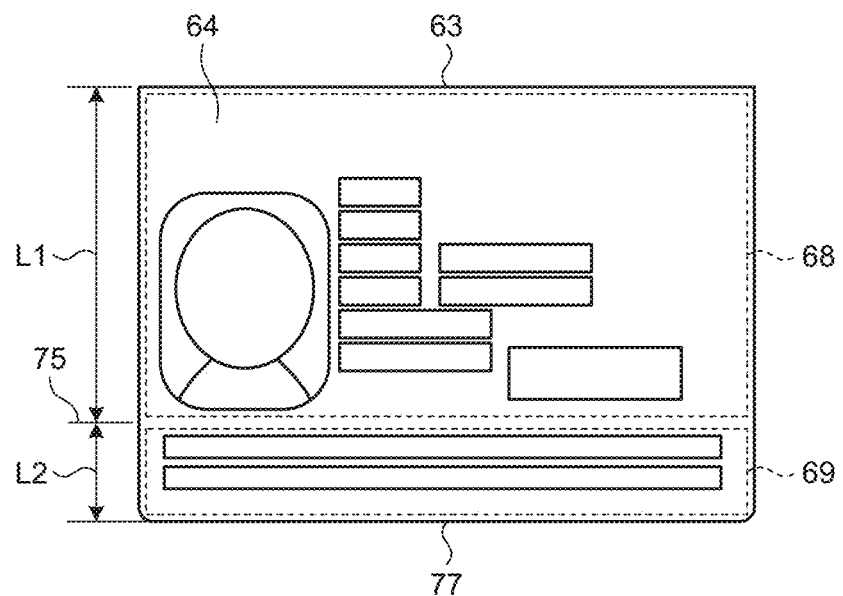
FIG. 8 is a plane view illustrating a face.

FIG. 8 is a plane view illustrating the face 64. The face 64 includes a visual inspection zone (VIZ) 68 and a machine readable zone (MRZ) 69. In the VIZ 68, there are character strings representing information on a person who is identified by the ICAO passport 61 and there is also a photograph of the person who is identified by the ICAO passport 61. In the MRZ 69, there are character strings. The MRZ 69 is arranged on a side distant from the binding portion 63 of the VIZ 68. The length of the VIZ 68 is equal to a distance from a border 75 at which the MRZ 69 and the VIZ 68 are adjacent to each other to the binding portion 63 and is equal to a length L1. The length of the MRZ 69 is equal to a distance from a front end 77 on a side opposite to the binding portion 63 in the thin portion 65 to the border 75 and is equal to a length L2. The length L2 of the MRZ 69 is shorter than the length L1 of the VIZ 68.

Figure 9:
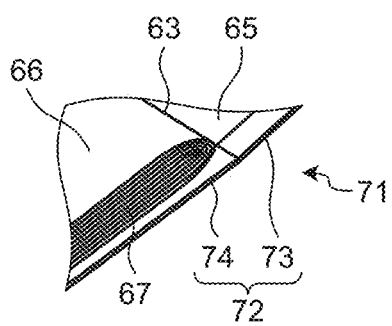
FIG. 9 is an enlarged perspective view illustrating a binding part of a German passport that is used in the image reading device of the embodiment.

A German passport 71 illustrated in FIG. 9 among passports is a passport that is issued in Germany in or before 2017. FIG. 9 is an enlarged perspective view illustrating the binding portion 63 of the German passport 71 that is used in the image reading device 1 of the embodiment. The German passport 71 is one obtained by adding a front cover 72 to the ICAO passport 61 described above and other aspects are the same as those of the above-described ICAO passport 61. In other words, when the German passport 71 is opened such that the face 64 is exposed, as in the ICAO passport 61, the thin portion 65 and the thick portion 66 are formed in the German passport 71.

The front cover 72 includes a thin portion side front cover 73 and a thick portion side front cover 74. When the German passport 71 is opened such that the face 64 is exposed, the thin portion side front cover 73 is along the thin portion 65. The thin portion side front cover 73 is larger than the thin portion 65 and the perimeter of the thin portion side front cover 73 extends from the perimeter of the thin portion 65. When the German passport 71 is opened such that the face 64 is exposed, the thick portion side front cover 74 is along the thick portion 66. The thick portion side front cover 74 is larger than the thick portion 66 and the perimeter of the thick portion side front cover 74 extends from the perimeter of the thick portion 66. In other words, one perimeter of the thick portion side front cover 74 extends from the plane along which the right-side end face 67 is and another perimeter of the thick portion side front cover 74 similarly extends from the plane along which the left-side end face is.

The left-side guide member 5 of the image reading device 1 is arranged such that the length L between the back end of the left-side holding portion 22 and the striking surface 17 of the abutting portion 12 is equal to the length L2 of the MRZ 69 or such that the length L is slightly longer than the length L2. The right-side guide member 6 is arranged such that the distance between the back end of the right-side holding portion 32 and the striking surface 17 of the abutting portion 12 is equal to the length L2 or such that the distance between the right-side holding portion 32 and the striking surface 17 is slightly longer than the length L2. The image reading device 1 is formed such that the distance between the left-side side guide surface 25 and the right-side side guide surface 35 is equal to the width W of the passport or such that the distance between the left-side side guide surface 25 and the right-side side guide surface 35 is slightly longer than the width W. The image reading device 1 is formed such that the width of the left-side front cover slit 29 is larger than the thickness of the front cover 72 and such that the width of the left-side front cover slit 29 is smaller than the thickness of the thick portion 66. Furthermore, the image reading device 1 is formed such that the depth of the left-side front cover slit 29 is longer than the length by which the front cover 72 extends from the left-side end face. The image reading device 1 is formed such that the width of the right-side front cover slit 39 is larger than the thickness of the front cover 72 and such that the width of the right-side front cover slit 39 is smaller than the thickness of the thick portion 66. Furthermore, the image reading device 1 is formed such that the depth of the right-side front cover slit 39 is longer than the length by which the front cover 72 extends from the right-side end face 67.

Operations of Image Reading Device 1

To read an image of the face 64 of the ICAO passport 61 with the image reading device 1, a user opens the ICAO passport 61 such that the face 64 faces up. Furthermore, the user points the thin portion 65 to the back side of the image reading device 1 such that the thin portion 65 is arranged on the back side with respect to the thick portion 66 and the user inserts the thin portion 65 into the image reading device 1 via the opening 8. Furthermore, the user arranges the thin portion 65 such that the thin portion 65 is arranged between the left-side upper guide portion 23 and the mount table body 11 and such that the thin portion 65 is arranged between the right-side upper guide portion 33 and the mount table body 11. After the thin portion 65 is arranged between the left-side upper guide portion 23 and the mount table body 11 and the thin portion 65 is arranged between the right-side upper guide portion 33 and the mount table body 11, the user moves the ICAO passport 61 to the back side.

Figure 10:
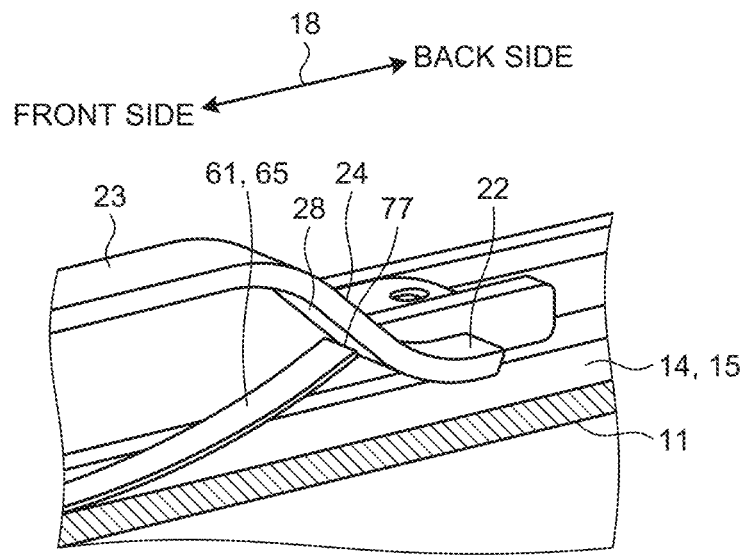
FIG. 10 is a perspective view illustrating the ICAO passport at the time when a tip of a thin portion on a back side makes contact with a left-side connection portion.
Figure 11:
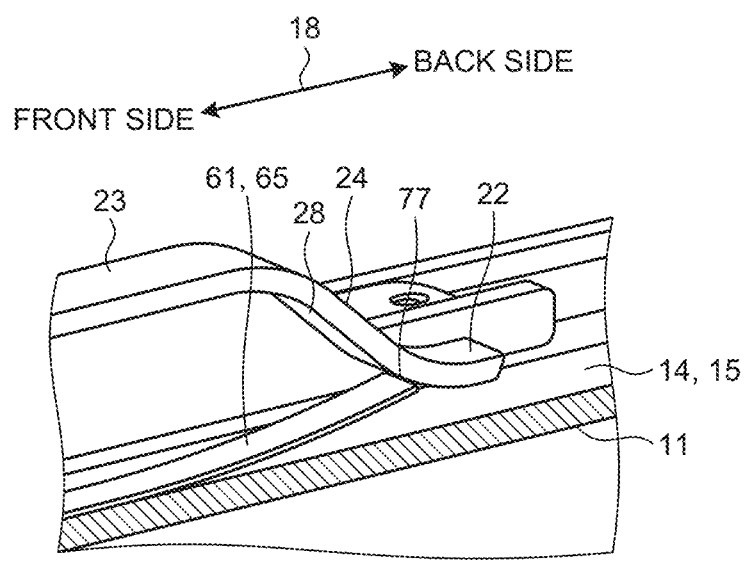
FIG. 11 is a perspective view illustrating the ICAO passport at the time when the tip of the thin portion gets close to a thin portion facing area.
Figure 12:
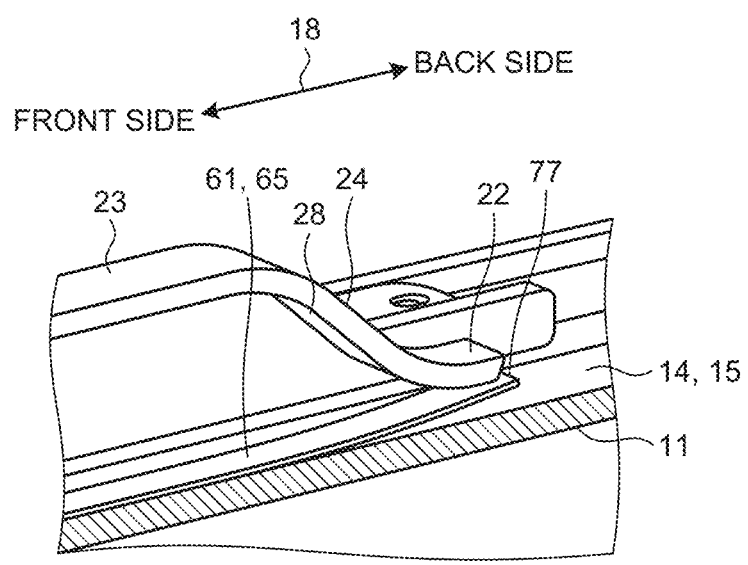
FIG. 12 is a perspective view illustrating the ICAO passport at the time when the thin portion is arranged between a left-side holding portion and a mount table body.

A left portion of the front end 77 of the thin portion 65 on the back side sometimes makes contact with the left-side connection portion 24 as illustrated in FIG. 10 when the ICAO passport 61 moves to the back side after the thin portion 65 is arranged between the left-side upper guide portion 23 and the mount table body 11. FIG. 10 is a perspective view illustrating the ICAO passport 61 at the time when the front end 77 of the thin portion 65 on the back side makes contact with the left-side connection portion 24. The ICAO passport 61 further moves to the back side after the front end 77 of the thin portion 65 makes contact with the left-side connection portion 24 and accordingly the front end 77 moves along the left-side curved surface 28 and gets close to the thin portion facing area 15 of the mount surface 14 as illustrated in FIG. 11. FIG. 11 is a perspective view illustrating the ICAO passport 61 at the time when the front end 77 of the thin portion 65 gets close to the thin portion facing area 15. The ICAO passport 61 further moves to the back side after the front end 77 gets close to the thin portion facing area 15 and accordingly the thin portion 65 is arranged smoothly between the left-side holding portion 22 and the mount table body 11 as illustrated in FIG. 12. FIG. 12 is a perspective view illustrating the ICAO passport at the time when the thin portion 65 is arranged between the left-side holding portion 22 and the mount table body 11.

When the ICAO passport 61 moves to the back side, a right portion of the front end 77 of the thin portion 65 on the back side is arranged between the right-side holding portion 32 and the mount table body 11 as the left portion of the front end 77 of the thin portion 65 is. In other words, the image reading device 1 makes it possible to, even if the thin portion 65 warps, guide the thin portion 65 such that the thin portion 65 is under the left-side holding portion 22 and the right-side holding portion 32 and enables easy operations performed by the user to arrange the thin portion 65 under the left-side holding portion 22 and the right-side holding portion 32.

Figure 13:
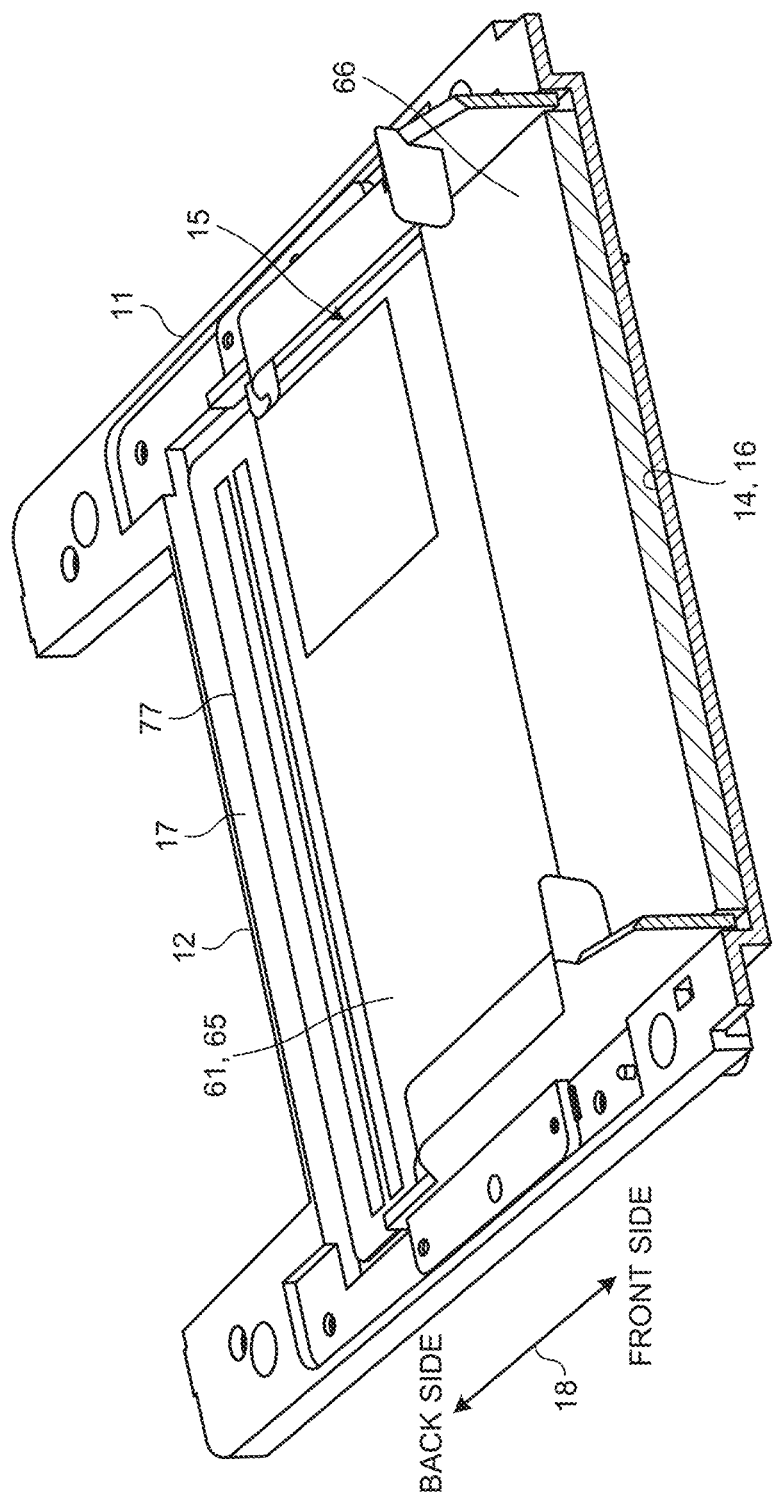
FIG. 13 is a perspective cross-sectional view illustrating the ICAO passport at the time when the ICAO passport is mounted on the mount table body appropriately.

As illustrated in FIG. 13, the user further moves the ICAO passport 61 to the back side until the front end 77 of the ICAO passport 61 is along the striking surface 17. FIG. 13 is a perspective cross-sectional view illustrating the ICAO passport 61 at the time when the ICAO passport 61 is mounted on the mount table body 11 appropriately. The front end 77 is along the striking surface 17 of the abutting portion 12 and accordingly the ICAO passport 61 is mounted on the mount table body 11 appropriately. The ICAO passport 61 is arranged such that, when the ICAO passport 61 is mounted on the mount table body 11 appropriately, the thin portion facing area 15 faces the thin portion 65 and the thick portion facing area 16 faces the thick portion 66. When the ICAO passport 61 is mounted on the mount table body 11 appropriately, the thin portion 65 is arranged in a predetermined image-capturing position.

When the ICAO passport 61 is mounted on the mount table body 11 appropriately, the thin portion 65 is pressed from above by the left-side holding portion 22 and the right-side holding portion 32. In other words, in the image reading device 1, even if the thin portion 65 warps, the thin portion 65 is pressed by the left-side holding portion 22 and the right-side holding portion 32, which makes it possible to prevent the thin portion 65 from deviating largely from the mount surface 14.

Figure 14:
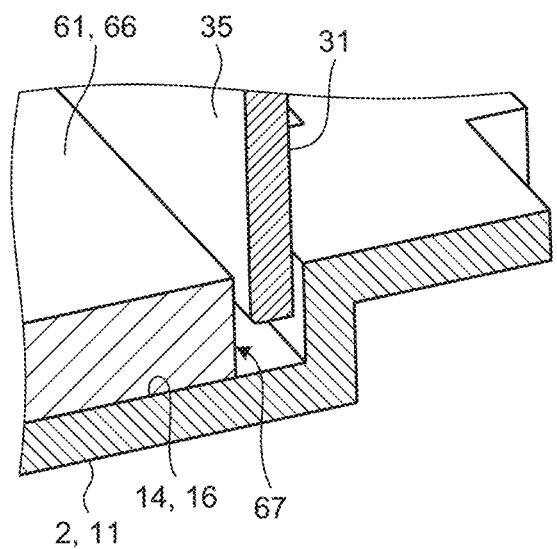
FIG. 14 is a perspective cross-sectional view illustrating a thick portion and a right-side side guide portion at the time when the ICAO passport is mounted on the mount table body appropriately.

When the ICAO passport 61 is mounted on the mount table body 11 appropriately, the right-side end face 67 of the thick portion 66 faces the right-side side guide surface 35 of the right-side side guide portion 31 as illustrated in FIG. 14. FIG. 14 is a perspective cross-sectional view illustrating the thick portion 66 and the right-side side guide portion 31 at the time when the ICAO passport 61 is mounted on the mount table body 11 appropriately. When the thick portion 66 shifts rightward, the right-side end face 67 makes contact with the right-side side guide surface 35 and accordingly the ICAO passport 61 is restricted from shifting rightward from the appropriate position. When the ICAO passport 61 is mounted on the mount table body 11 appropriately, the left-side end face of the thick portion 66 faces the left-side side guide surface 25 of the left-side side guide portion 21. When the thick portion 66 shifts leftward from the appropriate position, the left-side end face makes contact with the left-side side guide surface 25 and accordingly the ICAO passport 61 is restricted from shifting leftward from the appropriate position. In other words, the image reading device 1 makes it possible to, when the ICAO passport 61 is mounted on the mount table body 11 appropriately, support the thick portion 66 such that the ICAO passport 61 does not move in the width direction 19.

Figure 15:
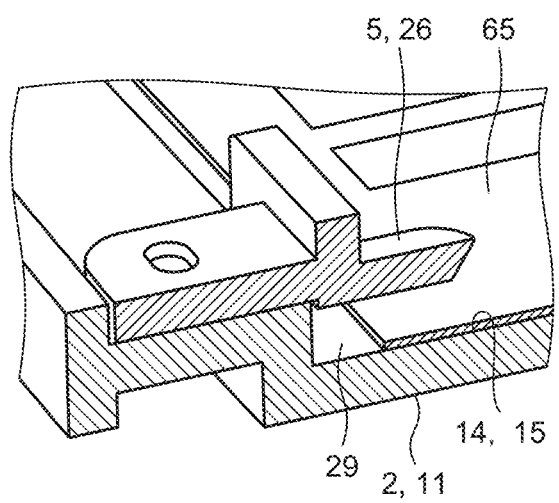
FIG. 15 is an enlarged perspective cross-sectional view illustrating a thin portion at the time when the ICAO passport is mounted on the mount table body appropriately.

When the ICAO passport 61 is mounted on the mount table body 11 appropriately, a left-side end face of the thin portion 65 makes contact with nothing as illustrated in FIG. 15. FIG. 15 is an enlarged perspective cross-sectional view illustrating the thin portion 65 at the time when the ICAO passport 61 is mounted on the mount table body 11 appropriately. When the ICAO passport 61 is mounted on the mount table body 11 appropriately, a right-side end face of the thin portion 65 makes contact with nothing as the left-side end face of the thin portion 65 does. Even when there is no member that makes contact with the left-side end face and the right-side end face of the thin portion 65, because the thick portion 66 is supported such that the ICAO passport 61 does not move in the width direction 19, the thin portion 65 is supported so as not to move from the image-capturing position in the width direction 19. In other words, the image reading device 1 makes it possible to, when the ICAO passport 61 is mounted on the mount table body 11 appropriately, support the ICAO passport 61 such that the thin portion 65 does not move from the image-capturing positon in the width direction 19.

Figure 16:
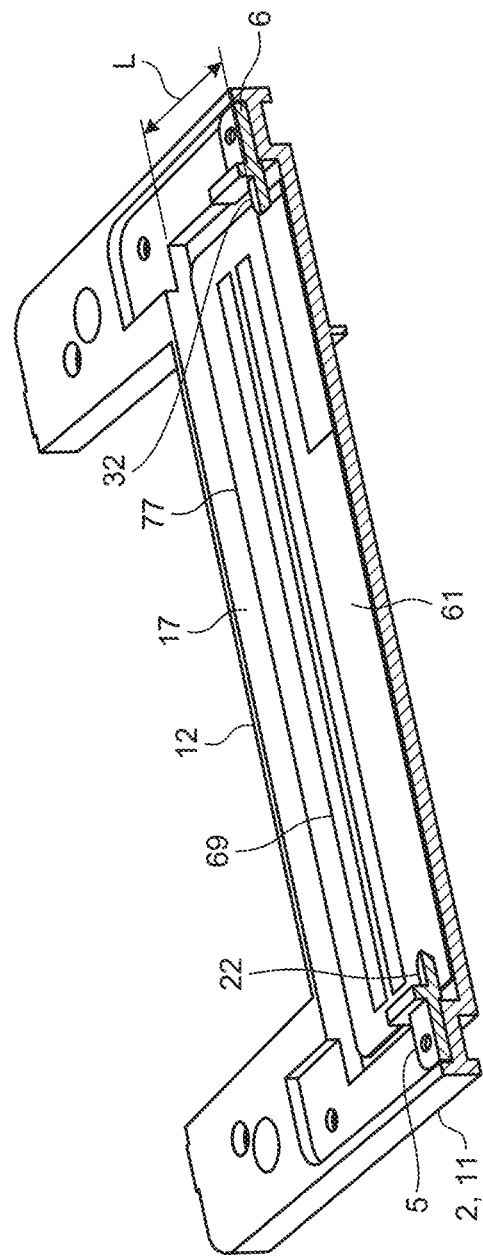
FIG. 16 is a perspective cross-sectional view illustrating the thin portion at the time when the ICAO passport is mounted on the mount table body appropriately.

When the thin portion 65 is arranged in the image-capturing position, as illustrated in FIG. 16, the front end 77 of the ICAO passport 61 is along the striking surface 17 and accordingly the ICAO passport 61 is corrected from an oblique state to a not-oblique state and the move is restricted such that the ICAO passport 61 is not oblique. FIG. 16 is a perspective cross-sectional view illustrating the thin portion 65 at the time when the ICAO passport 61 is mounted on the mount table body 11 appropriately.

When the thin portion 65 is arranged in the image-capturing position, a portion of the thin portion 65 in which the VIZ 68 is arranged is pressed by the left-side holding portion 22 and the right-side holding portion 32. When the thin portion 65 is arranged in the image-capturing position, the MRZ 69 is not pressed by the left-side holding portion 22 and the right-side holding portion 32 because the left-side holding portion 22 and the right-side holding portion 32 are separate from the abutting portion 12 by the length L. In other words, the image reading device 1 makes it possible to, when the ICAO passport 61 is mounted on the mount table body 11 appropriately, expose the whole MRZ 69 such that the MRZ 69 is not partly hidden behind the left-side holding portion 22 and the right-side holding portion 32.

Figure 17:
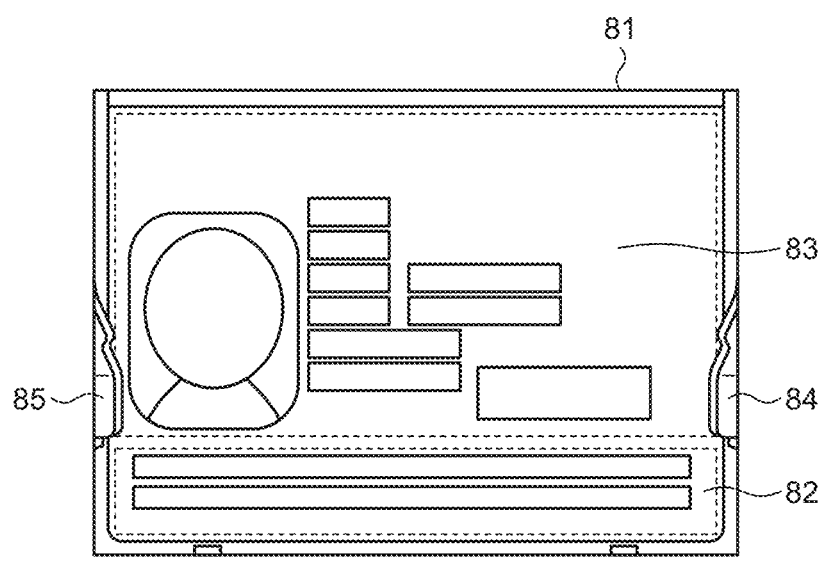
FIG. 17 is a diagram illustrating an image that is captured by an image capturing unit at the time when the ICAO passport is mounted on the mount table body appropriately.

When the ICAO passport 61 is mounted on the mount table body 11 appropriately, the image capturing unit 41 captures an image of the face 64. An image 81 that is captured by the image capturing unit 41 when the ICAO passport 61 is mounted on the mount table body 11 appropriately has an MRZ image 82, a VIZ image 83, a left-guide member image 84, and a right-side guide member image 85 as illustrated in FIG. 17. FIG. 17 is a diagram illustrating the image 81 that is captured by the image capturing unit 41 at the time when the ICAO passport 61 is mounted on the mount table body 11 appropriately. The whole MRZ 69 of the face 64 is on the MRZ image 82. In other words, in the image reading device 1, the MRZ 69 is not hidden behind the left-side guide member 5 and the right-side guide member 6 when the ICAO passport 61 is mounted on the mount table body 11 appropriately and thus the whole MRZ 69 can be on the image 81.

A portion of the VIZ 68 of the face 64 that is not hidden behind the left-side guide member 5 and the right-side guide member 6 is on the VIZ image 83. Part of the left-side holding portion 22 and the left-side connection portion 24 of the left-side guide member 5 is on the left-guide member image 84. Part of the right-side holding portion 32 and the right-side connection portion 34 of the right-side guide member 6 is on the right-side guide member image 85. In other words, in the image reading device 1, the left-side upper guide portion 23 and the right-side upper guide portion 33 are separate from the mount surface 14, which makes it possible to prevent the left-side upper guide portion 23 and the right-side upper guide portion 33 from being on the image 81. In the image reading device 1, when the ICAO passport 61 is mounted on the mount table body 11, the left-side upper guide portion 23 and the right-side upper guide portion 33 are not on the image 81, which makes it possible to reduce the portion of the VIZ 68 that is not on the image 81.

To read an image of the face 64 of the German passport 71 with the image reading device 1, the user mounts the German passport 71 on the mount table body 11 appropriately as in the case of the ICAO passport 61. In other words, the user opens the German passport 71 such that the face 64 faces up and inserts the German passport 71 into the image reading device 1 via the opening 8 until the front end 77 of the thin portion 65 on the side opposite to the binding portion 63 makes contact with the striking surface 17 of the abutting portion 12. The front end of the German passport 71 is along the striking surface 17 of the abutting portion 12 and accordingly the German passport 71 is mounted on the mount table body 11 appropriately.

Figure 18:
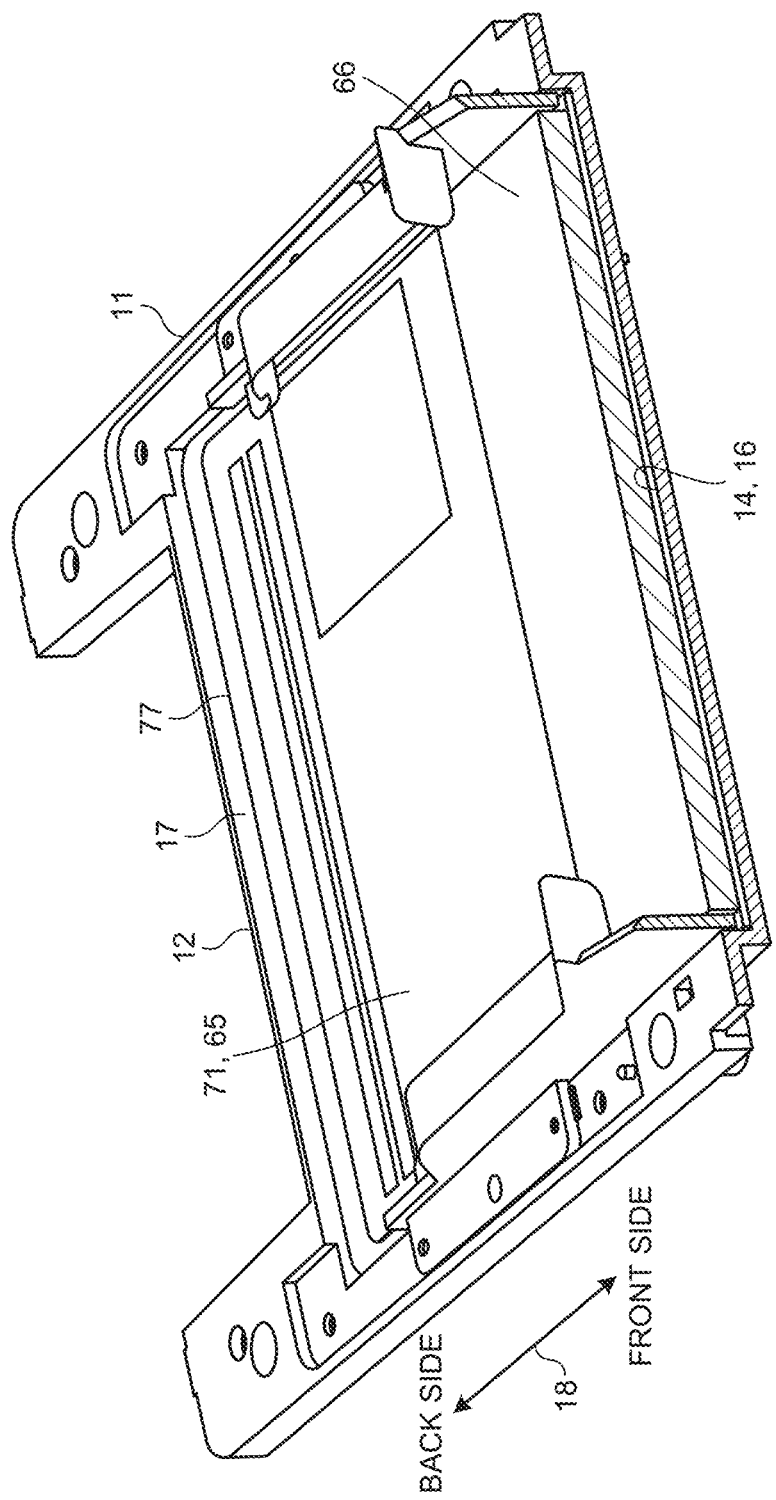
FIG. 18 is a perspective cross-sectional view illustrating a German passport at the time when the German passport is mounted on the mount table body appropriately.

FIG. 18 is a perspective cross-sectional view illustrating the German passport 71 at the time when the German passport 71 is mounted on the mount table body 11 appropriately. The German passport 71 is arranged such that, when the German passport 71 is mounted on the mount table body 11 appropriately, as in the case of the ICAO passport 61, the thin portion facing area 15 faces the thin portion 65 and the thick portion facing area 16 faces the thick portion 66. When the German passport 71 is mounted on the mount table body 11 appropriately, the thin portion 65 is arranged in an image-capturing position.

When the German passport 71 is mounted on the mount table body 11 appropriately, the thin portion 65 is pressed from above by the left-side holding portion 22 and the right-side holding portion 32. In other words, in the image reading device 1, even if the thin portion 65 warps, the thin portion 65 is pressed by the left-side holding portion 22 and the right-side holding portion 32, which makes it possible to prevent the thin portion 65 from deviating largely from the mount surface 14.

Figure 19:
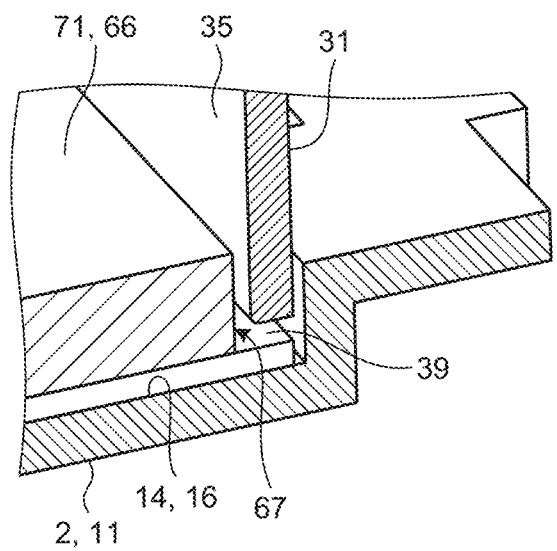
FIG. 19 is a perspective cross-sectional view illustrating the thick portion and the right-side side guide portion at the time when the German passport is mounted on the mount table body appropriately.

When the German passport 71 is mounted on the mount table body 11 appropriately, the portion of the thick portion side front cover 74 of the German passport 71 that extends from the right-side end face 67 is arranged in the right-side front cover slit 39 as illustrated in FIG. 19. FIG. 19 is a perspective cross-sectional view illustrating the thick portion 66 and the right-side side guide portion 31 at the time when the German passport 71 is mounted on the mount table body 11 appropriately. When the German passport 71 is mounted on the mount table body 11 appropriately, the portion of the thick portion side front cover 74 that extends from the left-side end face is arranged in the left-side front cover slit 29 as the portion that extends from the right-side end face 67 is.

When the German passport 71 is mounted on the mount table body 11 appropriately, the right-side end face 67 of the thick portion 66 of the German passport 71 faces the right-side side guide surface 35 of the right-side side guide portion 31. When the German passport 71 is mounted on the mount table body 11 appropriately, the left-side end face of the thick portion 66 of the German passport 71 faces the left-side side guide surface 25 of the left-side side guide portion 21 as the right-side end face 67 of the thick portion 66 is. In other words, when the German passport 71 is mounted on the mount table body 11 appropriately, the thick portion side front cover 74 does not hinder the left-side end face of the thick portion 66 from being along the left-side side guide surface 25. Thus, the image reading device 1 of the embodiment makes it possible to, when the German passport 71 is mounted on the mount table body 11 appropriately, support the thick portion 66 such that the German passport 71 does not move in the width direction 19.

Figure 20:
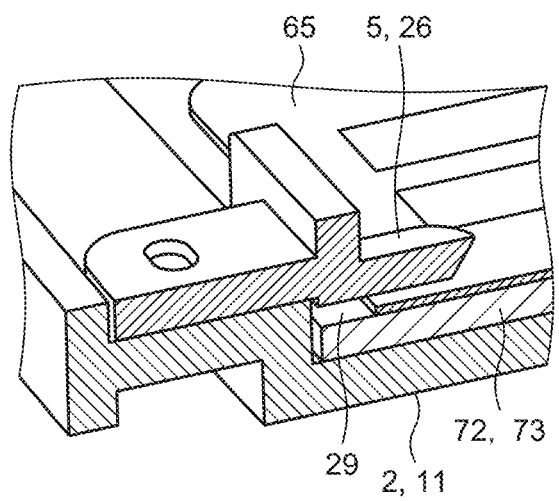
FIG. 20 is an enlarged perspective cross-sectional view illustrating the thin portion at the time when the German passport is mounted on the mount table body appropriately.

When the German passport 71 is mounted on the mount table body 11 appropriately, a portion of the thin portion side front cover 73 of the German passport 71 that extends from the thin portion 65 leftward is arranged in the left-side front cover slit 29 as illustrated in FIG. 20. FIG. 20 is an enlarged perspective cross-sectional view illustrating the thin portion 65 at the time when the German passport 71 is mounted on the mount table body 11 appropriately. When the German passport 71 is mounted on the mount table body 11 appropriately, a portion of the thin portion side front cover 73 of the German passport 71 that extends from the thin portion 65 rightward is arranged in the right-side front cover slit 39 as the portion of the thin portion side front cover 73 that extends from the thin portion 65 leftward is. In other words, the image reading device 1 makes it possible to, when the German passport 71 is mounted on the mount table body 11 appropriately, arrange the thin portion 65 in the image-capturing position appropriately without interference of the thin portion side front cover 73.

Figure 21:
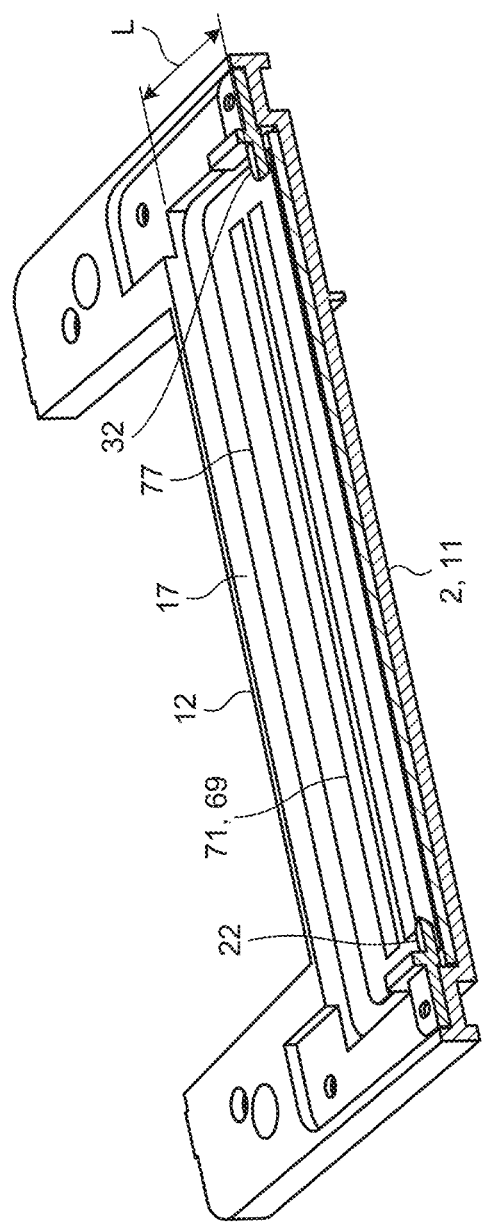
FIG. 21 is a perspective cross-sectional view illustrating the thin portion at the time when the German passport is mounted on the mount table body appropriately.

When the thin portion 65 is arranged in the image-capturing position, as illustrated in FIG. 21, the front end 77 of the German passport 71 is along the striking surface 17 and accordingly the German passport 71 is corrected from an oblique state to a not-oblique state and the move is restricted such that the German passport 71 is not oblique. FIG. 21 is a perspective cross-sectional view illustrating the thin portion 65 at the time when the German passport 71 is mounted on the mount table body 11 appropriately.

When the thin portion 65 is arranged in the image-capturing position, a portion of the thin portion 65 in which the VIZ 68 is arranged is pressed by the left-side holding portion 22 and the right-side holding portion 32. When the thin portion 65 is arranged in the image-capturing position, the MRZ 69 is not pressed by the left-side holding portion 22 and the right-side holding portion 32 because the left-side holding portion 22 and the right-side holding portion 32 are separate from the abutting portion 12 by the length L. In other words, the image reading device 1 makes it possible to, when the German passport 71 is mounted on the mount table body 11 appropriately, expose the whole MRZ 69 such that the MRZ 69 is not partly hidden behind the left-side holding portion 22 and the right-side holding portion 32.

In other words, the image reading device 1 makes it possible to, even when the German passport 71 is inserted into the image reading device 1 via the opening, arrange the thin portion 65 in the image-capturing position appropriately. In the image reading device 1, the thin portion 65 of the German passport 71 is arranged in the image-capturing position appropriately, which makes it possible to capture an image of the face 64 of the German passport 71 appropriately.

In an image reading device of a comparative example, the left-side front cover slit 29 and the right-side front cover slit 39 of the image reading device 1 of the above-described embodiment are omitted and the distance between the left-side side guide surface 25 and the right-side side guide surface 35 is equal to the width of the front cover 72 of the German passport 71. Other aspects of the image reading device of the comparative example are the same as those of the image reading device 1 of the above-described embodiment. In the image reading device of the comparative example, when the German passport 71 is mounted on the mount table body 11 with the front end 77 being along the striking surface 17, the front cover 72 makes contact with the left-side side guide surface 25 and the right-side side guide surface 35, which makes it possible to prevent the German passport 71 from shifting in the width direction 19.

Figure 22:
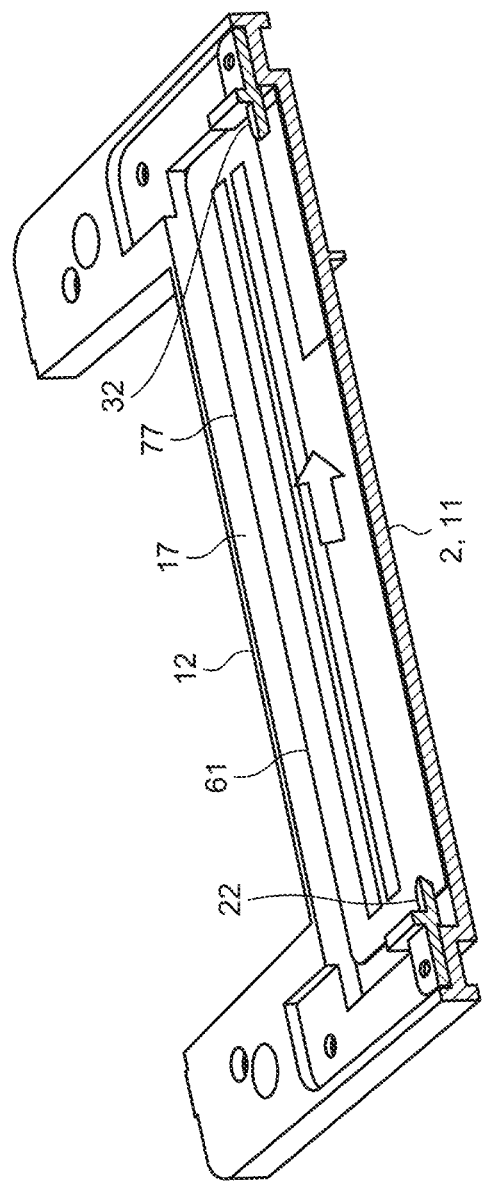
FIG. 22 is a perspective cross-sectional view illustrating the ICAO passport that is mounted on a mount table body of an image reading device of a comparative example.

When the ICAO passport 61 is mounted on the mount table body 11 appropriately, the total of the gap between the left-side end face of the thick portion 66 of the ICAO passport 61 and the left-side side guide surface 25 and the gap between the right-side end face 67 and the right-side side guide surface 35 is relatively large. Thus, in the image reading device of the comparative example, as illustrated in FIG. 22, the thin portion 65 of the ICAO passport 61 sometimes shifts from the image-capturing position in the width direction 19. FIG. 22 is a perspective cross-sectional view illustrating the ICAO passport 61 that is mounted on the mount table body 11 of an image reading device of the comparative example. In other words, compared to the image reading device of the comparative example, the image reading device 1 makes it possible to arrange the thin portion 65 of the ICAO passport 61 in the image-capturing position appropriately and capture an image of the face 64 of the ICAO passport 61 appropriately.

Effect of Image Reading Device 1 of Embodiment

The image reading device 1 of the embodiment includes the mount table body 11, the left-side side guide portion 21, and the image capturing unit 41. In the mount table body 11, the mount surface 14 is formed. In the left-side side guide portion 21, the left-side side guide surface 25 that faces the left-side end face of the thick portion 66 of a passport that is mounted on the mount table body 11 such that the mount surface 14 faces the passport is formed. The image capturing unit 41 captures an image of the thin portion 65 that is different from the thick portion 66 of the passport. The left-side front cover slit 29 is formed at the end of the left-side side guide portion 21 on the side close to the mount surface 14.

The image reading device 1 of the embodiment makes it possible to prevent the thick portion 66 of the passport from shifting leftward, prevent the thin portion 65 of the passport from shifting leftward, and further arrange the thin portion 65 in the appropriate position. Furthermore, in the image reading device 1 of the embodiment, even when the German passport 71 is mounted on the mount table body 11, the front cover 72 is inserted into the left-side front cover slit 29 and accordingly the front cover 72 does not hinder the left-side end face of the thick portion 66 from being along the left-side side guide surface 25. Thus, the image reading device 1 of the embodiment makes it possible to arrange the face 64 of the thin portion 65 of even any of the ICAO passport 61 without the front cover 72 and the German passport 71 that is provided with the front cover 72 in the appropriate positon. In the image reading device 1 of the embodiment, the thin portion 65 is arranged in the appropriate position, which makes it possible to appropriately capture the image 81 of the face 64 that is formed in the thin portion 65.

The image reading device 1 of the embodiment further includes the abutting portion 12 in which the striking surface 17 that faces the front end 77 of the thin portion 65 on the side opposite to a binding side end that is connected to the thick portion 66. In the image reading device 1 of the embodiment, the front end 77 is along the striking surface 17, which makes it possible to arrange the thin portion 65 in the appropriate position such that the position of the thin portion 65 in the insertion direction 18 is appropriate and such that the thin portion 65 is not oblique.

The image reading device 1 of the embodiment further includes the left-side holding portion 22 in which the left-side pressing surface 26 that faces the thin portion facing area 15 of the mount surface 14 that faces the thin portion 65 is formed. The left-side holding portion 22 is separate from the abutting portion 12. In the image reading device 1 of the embodiment, it is possible to press the thin portion 65 from above such that the thin portion 65 is not separate from the mount surface 14 largely. Furthermore, the image reading device 1 of the embodiment makes it possible to capture the image 81 of the face 64 appropriately such that the whole MRZ 69 of the face 64 of the passport that is arranged on the side close to the left-side pressing surface 26 is on the image 81.

The image reading device 1 of the embodiment further includes the left-side upper guide portion 23 in which the left-side upper guide surface 27 that faces the thin portion facing area 15 is formed and the left-side connection portion 24 in which the left-side curved surface 28 is formed. The distance between the thin portion facing area 15 and the left-side upper guide surface 27 is longer than the distance between the thin portion facing area 15 and the left-side pressing surface 26. The left-side upper guide surface 27 is connected to the left-side pressing surface 26 via the left-side curved surface 28. The left-side curved surface 28 is formed such that the left-side curved surface 28 separates from the mount surface 14 as it separates from the left-side holding portion 22. The image reading device 1 of the embodiment enables easy operations performed by the user to arrange the thin portion 65 between the mount surface 14 and the left-side holding portion 22. Furthermore, the image reading device 1 of the embodiment makes it possible to capture the image 81 of the face 64 such that left-side upper guide portion 23 is not on the image 81 and reduce the portion of the face 64 that is not on the image 81.

The image reading device 1 of the embodiment further includes the right-side side guide portion 31 in which the right-side side guide surface 35 that faces the right-side end face 67 of the thick portion 66 on the side opposite to the left-side end face is formed. On the end of the right-side side guide portion 31 on the side close to the mount surface 14, the right-side front cover slit 39 is formed. The image reading device 1 of the embodiment makes it possible to prevent the thick portion 66 of the passport from shifting rightward, prevent the thin portion 65 of the passport from shifting rightward, and arrange the thin portion 65 in the appropriate position. Furthermore, in the image reading device 1 of the embodiment, even when the German passport 71 is mounted on the mount table body 11, the front cover 72 is inserted into the right-side front cover slit 39 and accordingly the front cover 72 does not hinder the right-side end face 67 of the thick portion 66 from being along the right-side side guide surface 35. Thus, the image reading device 1 of the embodiment makes it possible to arrange the face 64 of the thin portion 65 of even any of the ICAO passport 61 without the front cover 72 and the German passport 71 that is provided with the front cover 72 in the appropriate positon. In the image reading device 1 of the embodiment, the thin portion 65 is arranged in the appropriate position, which makes it possible to appropriately capture the image 81 of the face 64 that is formed in the thin portion 65.

The image reading device 1 of the embodiment is provided with both the left-side guide member 5 and the right-side guide member 6; however, one of the left-side guide member 5 and the right-side guide member 6 may be omitted. For example, in the image reading device 1, when the left-side guide member 5 is omitted, the passport is mounted on the mount table body 11 such that the right-side end face 67 of the thick portion 66 is along the left-side side guide surface 25, which makes it possible to arrange the thick portion 66 in an appropriate position and arrange the thin portion 65 in an appropriate position.

The image reading device 1 of the above-described embodiment is used to read an image of the face 64 of the passport, and the device may be utilized to read an image of a specific page of another booklet medium that differs from passports. A passbook is exemplified as the booklet medium. Also in this case, the image reading device 1 makes it possible to arrange the booklet medium in an appropriate position regardless whether the booklet medium is provided with a front cover and read an image of a specific page of the booklet medium appropriately.

The image reading device disclosed herein is capable of capturing an image of a booklet medium appropriately.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. An image reading device comprising:
    a mount table having a mount surface on which a booklet medium is mounted such that the mount surface and the booklet medium face each other;
    a guide portion having a guide surface, the guide surface facing a side end face of the booklet medium that is mounted on the mount table;
    an image capturer arranged to face the mount table and configured to capture an image of the booklet medium while the booklet medium is being mounted on the mount table and the side end face of the booklet medium is facing the guide surface; and
    a front cover slit into which the booklet medium is inserted while the booklet medium is being mounted on the mount table, the side end face of the booklet medium is facing the guide surface, and the image of the booklet medium is being captured by the image capturer, wherein the front cover slit is provided between the guide portion and the mount table.

2. The image reading device according to claim 1, further comprising an abutting portion having a striking surface, the striking surface facing a front end of the booklet medium.

3. The image reading device according to claim 2, further comprising a holding portion having a pressing surface, the pressing surface facing an area of the mount surface facing the booklet medium,
   wherein the holding portion is separate from the striking surface.

4. The image reading device according to claim 3, further comprising:
   an upper guide portion having an upper guide surface that faces the area; and
   a connection portion having a curved surface,
   wherein a distance between the area and the upper guide surface is longer than a distance between the area and the pressing surface,
   the upper guide surface is connected to the pressing surface via the curved surface, and
   the curved surface separates from the mount surface as the curved surface separates from the holding portion.

5. The image reading device according to claim 1, further comprising an opposite guide portion having an opposite guide surface, the opposite guide surface facing another side end face on a side opposite to the side end face,
   wherein an opposite front cover slit to insert the booklet medium therein is provided between the opposite guide portion and the mount table.

6. An image reading device comprising:
   a mount table having a mount surface;
   a guide portion having a guide surface, the guide surface facing a side end face of a booklet medium that is mounted on the mount table such that the mount surface faces the booklet medium;
   an image capturer arranged to face the mount table and configured to capture an image of the booklet medium; and
   an abutting portion having a striking surface, the striking surface facing a front end of the booklet medium,
   wherein a front cover slit, into which the booklet medium is inserted, is provided between the guide portion and the mount table.

7. An image reading device comprising:
   a mount table having a mount surface;
   a guide portion having a guide surface, the guide surface facing a side end face of a first portion of a booklet medium that is mounted on the mount table such that the mount surface faces the booklet medium;
   an opposite guide portion having an opposite guide surface, the opposite guide surface facing another side end face on a side opposite to the side end face; and
   an image capturer arranged to face the mount table and configured to capture an image of the booklet medium,
   wherein a front cover slit, into which the booklet medium is inserted, is provided between the guide portion and the mount table, and
   wherein an opposite front cover slit to insert the booklet medium therein is provided between the opposite guide portion and the mount table.

\* \* \* \* \*